United States Patent
Kurosaki

(10) Patent No.: US 8,065,450 B2
(45) Date of Patent: Nov. 22, 2011

(54) FRAME TRANSFER METHOD AND DEVICE

(75) Inventor: Hiroshi Kurosaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 441 days.

(21) Appl. No.: 11/959,640

(22) Filed: Dec. 19, 2007

(65) Prior Publication Data

US 2008/0155202 A1    Jun. 26, 2008

(30) Foreign Application Priority Data

Dec. 26, 2006  (JP) .................................. 2006-349819

(51) Int. Cl.
*G06F 12/02* (2006.01)
(52) U.S. Cl. .............................. 710/53; 710/55; 711/159
(58) Field of Classification Search ........................ None
See application file for complete search history.

(56) References Cited

U.S. PATENT DOCUMENTS

| | | | | |
|---|---|---|---|---|
| 5,535,366 | A * | 7/1996 | Pfeiffer et al. ................. | 711/159 |
| 6,535,516 | B1 * | 3/2003 | Leu et al. ................. | 370/395.72 |
| 2007/0104187 | A1 * | 5/2007 | Tatapudi et al. .............. | 370/368 |

FOREIGN PATENT DOCUMENTS

| | | |
|---|---|---|
| JP | 11-102325 | 4/1999 |
| JP | 11-261569 | 9/1999 |
| JP | 2000-200210 | 7/2000 |

OTHER PUBLICATIONS

Notification of Reason for Refusal dated Apr. 19, 2011, from corresponding Japanese Application No. 2006-349819.

* cited by examiner

*Primary Examiner* — Gary Portka
(74) *Attorney, Agent, or Firm* — Katten Muchin Rosenman LLP

(57) ABSTRACT

In a frame transfer method and device by which an address space of a shared buffer can be effectively utilized without a reduction of the space even if an abnormal operation occurs in a management of the shared buffer, after frame data is written in the shared buffer during one monitor cycle when the frame data is to be read without fail from the shared buffer, an address space where the frame data has not been read from the shared buffer is detected during a next monitor cycle, and an address space where not a read but a write of the frame data has been performed at least during the monitor cycle is detected. In the next monitor cycle, the address space is released as a free address of the shared buffer.

4 Claims, 11 Drawing Sheets

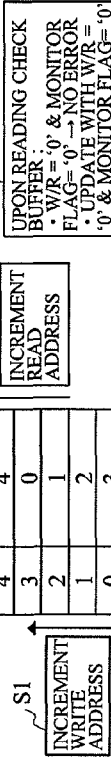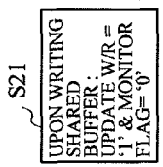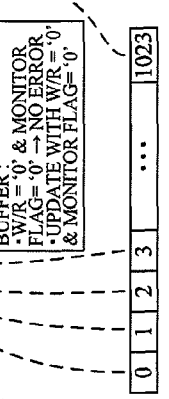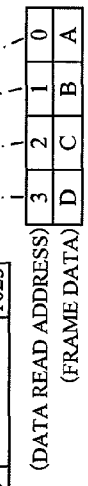

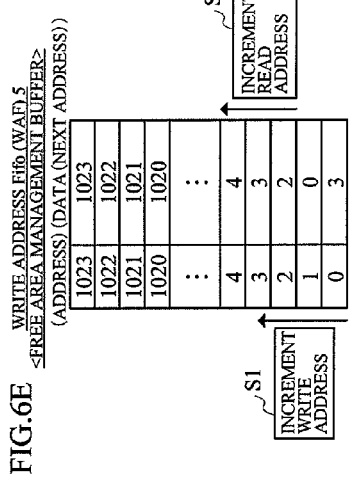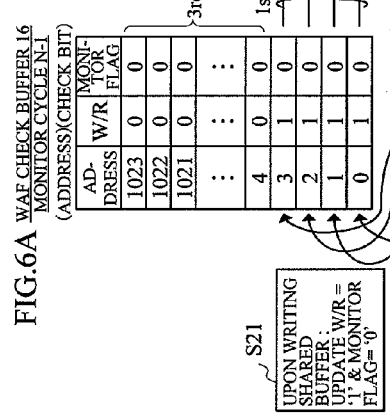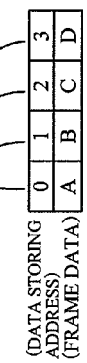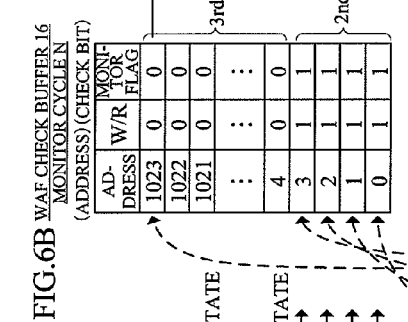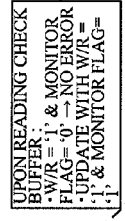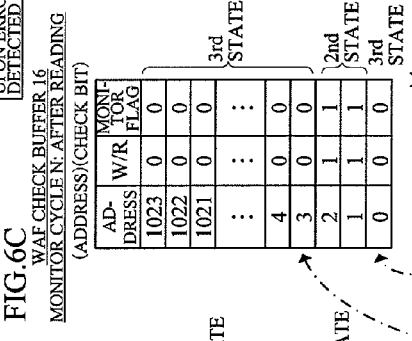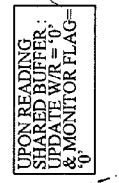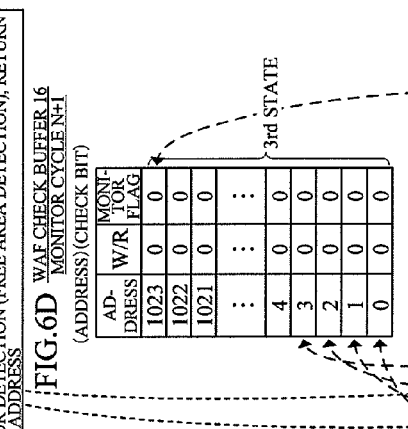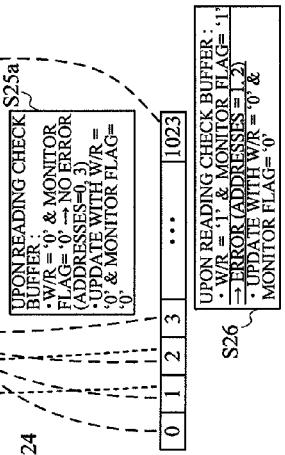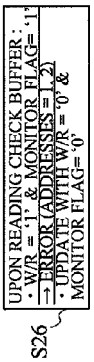

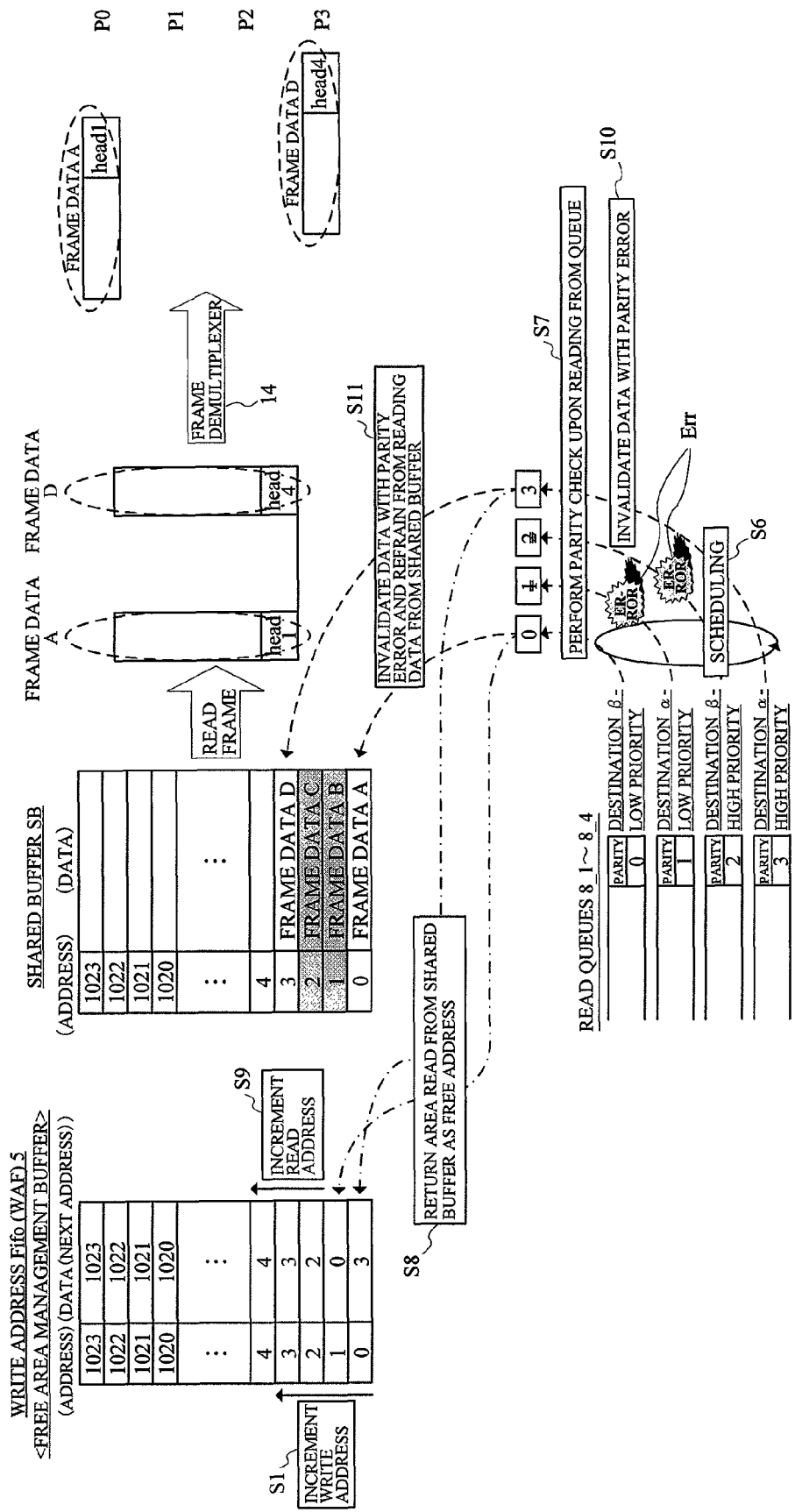

FRAME TRANSFER METHOD AND DEVICE

BACKGROUND OF THE INVENTION

1. Field of the Invention

The present invention relates to a frame transfer method and device, and in particular to a frame transfer method and device in an L2 switch using a shared buffer.

2. Description of the Related Art

Recently, devices have been micromachined, and an operation speed within a device and an interface speed between devices have been enhanced, so that a malfunction within the device, a noise of the interface between the devices, and the like have become considerable. Therefore, an abnormal operation may sometimes occur in an L2 switch or the like upon managing a shared buffer.

While such a problem has been approached by correction of data with an error correction code (ECC) or the like, the correction can be performed only to data with a single bit error or the like, but could not be performed to data with plural bit errors.

Therefore, when a parity error, an ECC error (uncorrectable error upon detecting plural bit errors), and the like are detected in a circuit managing the shared buffer, the prior art has prevented a malfunction by invalidating an area of the shared buffer. The prior art will now be described referring to the attached figures.

FIG. 7 schematically shows an example of the L2 switch using the shared buffer which has been conventionally known. As for L2 frame data (hereinafter, occasionally referred to as simply frame) inputted from each of ports P0-P3 of line interface unit (LIU) cards C#0-C#3, L2 frame terminating/generating portions TG#0-TG#3 respectively retrieve forwarding database (FDB) by using a destination address (DA) within the frame to acquire card information and port information of a frame transfer destination from the database FDB, and transfer the frame to a switch card SWC side. Upon the transferring, the card information and the port information are added to the frame.

When the destination address within the frame is not registered in the database FDB, the L2 frame terminating/generating portions TG#0-TG#3 add the card information and the port information to the frame to be transferred (flooded) to all of the LIU cards C#0-C#3, since the card information and the port information are not added to the L2 frame inputted from the switch card SWC. Namely, in the interface between the LIU cards C#0-C#3 and the switch card SWC, the card information and the port information are added for the purpose of transferring within the device.

The switch card SWC multiplexes the frames (including card information and port information) received through the ports P0-P3 from each of the LIU cards C#0-C#3 to be once stored in the shared buffer SB. Also, the address of the shared buffer SB upon storing the frame in the shared buffer SB is stored in a queue which will be described later, provided and managed per LIU card as a destination and per priority degree (hereinafter, referred to simply as priority) within the LIU card. Upon reading from the shared buffer SB, a switch portion SP performs a priority control per LIU card to acquire the address from the queue. The data (frame) is read from the shared buffer SB by using the acquired address to be transferred to the object LIU card.

The LIU cards C#0-C#3 specify a transfer destination port (any one or more of P0-P3 of LIU card) based on the L2 frame (including card information and port information) having received from the switch card SWC, and transfers the frame to the associated port. At this time, the information added to the frame in the L2 switch SW is deleted.

The specific arrangement and operation of the prior art switch card SWC in the L2 switch SW will now be described referring to FIGS. 8-11.

FIG. 8 shows a prior art example of the switch portion SP composing the switch card SWC together with the shared buffer SB. Firstly, upon writing a frame to the shared buffer SB, a frame inputted from each of the ports P0-P3 of the switch portion SP shown in FIG. 7 is multiplexed by a frame multiplexer 1 and transferred to a WAF read controller 2, a parity generator 3, a destination information/priority control information extractor 4, and the shared buffer SB.

The destination information/priority control information extractor 4 extracts destination information and priority control information added to the frame in the L2 frame terminating/generating portions TG#0-TG#3 in the LIU cards C#0-C#3, and transfers the extracted information to a write controller 6. Concurrently, the WAF read controller 2 acquires a free area (address) of the shared buffer SB from a Fifo (WAF: Write Address Fifo) 5 by designating a circular (iteration) address. Also, the WAF read controller 2 transfers the acquired free address to the shared buffer SB and the write controller 6 as a "write address". The parity generator 3 outputs a result (parity bit) after performing a parity calculation for the detection of failure to the frame inputted and outputs the frame, so that the shared buffer SB stores the parity result and the frame in the free area (write address) acquired from the write address Fifo 5 through the WAF read controller 2.

At this time, the write controller 6 sequentially selects the LIU card as a destination and a concerned queue among read queues 8_1-8_4 (hereinafter, occasionally represented by a reference numeral 8) provided per priority of the LIU card, based on the destination information and the priority control information transferred from the destination information/priority control information extractor 4, and transfers the write address acquired from the write address Fifo 5 to the selected queue. Also, a write flag WFLG for the selected queue is transferred to the read controller 10.

It is to be noted that four units of read queues 8 are shown in the example of FIG. 8, which indicates that e.g. the read queue 8-4 of destination α—high priority and the read queue 8-2 of destination α—low priority correspond to the LIU card C#1, and the read queue 8-3 of destination β—high priority and the read queue 8-1 of destination β—low priority correspond to the LIU card C#2. Accordingly, in the presence of four units of LIU cards C#0-C#3 as shown in the example of FIG. 7, 8 units of read queues are required, where only four units of the read queues are shown for convenience sake.

The parity generator among parity generators 7_1-7_4 (hereinafter, occasionally represented by a reference numeral 7) corresponding to the selected queue 8 outputs a result (parity bit) after performing the parity calculation for the detection of failure to the write address transferred from the write controller 6 and the write address, and the concerned queue 8 stores the write address as a "read address". When receiving the write flag WFLG transferred from the write controller 6, the read controller 10 monitors a queue capacity (read address) per queue 8, and counts up a capacity counter (not shown) installed in the read controller 10.

Upon reading the frame from the shared buffer SB, the read controller 10 can determine whether or not the frame data to be outputted is accumulated within the shared buffer SB, as mentioned above, with the capacity counter indicating the capacity of the read address stored in each queue 8.

When the capacity counter for monitoring per queue 8 is not "0", the read controller 10 performs the priority control and a fairness control (e.g. round robin) of each queue 8, and reads the read address from the queue 8 selected as a result of the control. Parity checkers 9_1-9_4 (hereinafter, occasionally represented by a reference numeral 9) perform the parity calculation to the read address read to be compared with the parity bit assigned by the parity generator 7.

In the presence of error found as a result of the comparison, the read controller 10 receives an error signal, and discards the read address read from the queue 8, so that the transfer to the shared buffer SB is not performed. Namely, the frame corresponding to the concerned read address is not read from the shared buffer. In the absence of error, the read controller 10 transfers the read address read from the queue 8 to the shared buffer SB and a WAF write controller 11. Also, the read controller 10 transfers to a frame demultiplexer 14 the information of the selected queue as output port information. When the destination α corresponds to the LIU card C#1 as with the above-mentioned example, information P1 indicating the port P1 of the switch portion SP corresponding to the output to the LIU card C#1 is transferred to the frame demultiplexer 14 as output port information.

The shared buffer SB takes out the data (frame) based on the read address received from the read controller 10, and the parity checker 12 at the subsequent stage performs the parity calculation to the data to be compared with the parity bit assigned by the parity generator 3.

In the presence of error found as a result of the comparison, the read frame is discarded by a data discard determining portion 13. In the absence of error, the read frame is transferred to the frame demultiplexer 14. The frame demultiplexer 14 demultiplexes the frame received from the data discard determining portion 13 to be transferred to a port designated by the output port information received from the read controller 10.

Also, the WAF write controller 11 stores the read address received from the read controller 10 in the write address Fifo 5 as data. The then address of the write address Fifo 5 assumes a circular address managed by the WAF write controller 11. By this operation, the shared buffer address where the frame is read from the shared buffer SB is to be stored in the write address Fifo 5 as a free address. In the following description, this operation is occasionally described as "returning a free address or return of a free address".

The above-mentioned write/read operation will now be described referring to the attached figures as an operation up to transferring the frame data inputted from each of the ports P0-P3 in the switch card SWC shown in FIG. 8 to the ports P0-P3 which form the destination.

Firstly, in the frame write side operation (writing operation) in the shared buffer SB having areas of addresses "0-1023" shown in FIG. 9, destinations and priorities are stored in header information head1-head4 of input frame data A, B, C, and D. As shown in FIG. 8, it is supposed that destination β—low priority, destination α—low priority, destination β—high priority, and destination β—high priority are respectively added to the frame data. It is to be noted that FIG. 9 shows an example where frame data with the same destination and different priorities are inputted at different times.

The frame data inputted from the ports P0-P3 respectively corresponding to the LIU cards C#0-C#3 are multiplexed by the frame multiplexer 1.

Thereafter, the WAF read controller 2 requests the write address Fifo 5 to acquire an address for storing the frame data in the shared buffer SB per frame data (in this example, the write addresses "0, 1, 2, and 3" for the shared buffer SB are acquired as a result).

Specifically, when receiving the frame data A, the WAF read controller 2 transmits the address "0" to the write address Fifo 5 (WAF) 5 as e.g. an initial value. The write address Fifo 5 transmits a free address "0" of the shared buffer SB to the WAF read controller 2 as data (subsequent address for the shared buffer SB). Similarly, when receiving the frame data B, C, and D, the WAF read controller 2 transmits circular addresses "1", "2", and "3" respectively to the write address Fifo 5, which sequentially transmits data "1", "2", and "3" of the circular addresses to the WAF read controller 2.

Thus, the WAF read controller 2, every time the frame data is received, increments an address to be transmitted to the write address Fifo 5, thereby requesting an acquisition of the shared buffer storing address (at steps S1 and S2). The WAF read controller 2 sequentially acquires the free addresses (addresses "0, 1, 2, and 3" in this example) of the shared buffer SB from the write address Fifo 5 (at step S3).

The parity generator 3 adds parity bits for the detection of failure to the acquired free address spaces "0, 1, 2, and 3" (at step S5), and writes the frame data A-D respectively in the addresses "0, 1, 2, and 3" of the shared buffer SB (at step S4).

Also, the destination information/priority control information extractor 4 extracts the header information of the frame data (in this example, destination β—low priority, destination α—low priority, destination β—high priority, and destination α—high priority corresponding to the frame data A, B, C, D respectively). The write controller 6, based on the extracted header information, writes in any one of the read queues 8_1-8_4 which are the transferring destination, the write address acquired from the WAF read controller 2 as data of the read address with the parity bit for the detection of failure generated by the parity generators 7_1-7_4 added (at step S5). In this example, the addresses "0, 1, 2, and 3" are respectively written as read addresses in the queues 8_1-8_4 corresponding to the write addresses "0, 1, 2, and 3".

In the read side operation (reading operation) at normal time shown in FIG. 10, the read controller 10 performs read scheduling (arbitration) to the read queues 8_1-8_4 in which the write addresses are stored in FIG. 9 (at step S6), and acquires the read addresses from the read queues 8_1-8_4. Upon the acquiring, checking the parity bit for the detection of failure is performed by the parity checkers 9_1-9_4 (at step S7). The addresses (no error is detected in failure detection) acquired at this time are used as addresses for reading the frame data from the shared buffer SB. It is to be noted that since the scheduling is performed in order of destination α with high priority, destination β with high priority, destination α with low priority, and destination β with low priority in this example, the addresses (read addresses) of the shared buffer SB are sequentially read in order of read queues 8-4, 8-3, 8-2, and 8-1, and accordingly from the shared buffer SB, the frame data D, C, B, and A respectively corresponding to order of addresses "3, 2, 1, and 0" are read.

The read controller 10 returns the acquired addresses (no error is detected in the failure detection) to the write address Fifo 5 as free addresses after reading the frame from the shared buffer SB (at steps S8 and S9), thereby releasing an available area. In this example, the next address data "3, 2, 1, and 0" are stored in the addresses "0, 1, 2, and 3" of the write address Fifo 5 through the WAF write controller 11 in order of reading the frame data D, C, B, and A from the shared buffer SB.

Accordingly, when the addresses "0, 1, 2, and 3" of the write address Fifo 5 are designated from the WAF read controller 2, writing the frame is performed respectively to the free addresses "3, 2, 1, and 0" of the shared buffer SB. However, since the WAF read controller 2 designates the circular address up to "1023" for the write address Fifo 5, when the WAF address "3" is designated corresponding to the frame data D as mentioned above, the address "4" of the write address Fifo 5 is to be designated for the frame which arrives next.

In the reading operation example (abnormal time) shown in FIG. 11, as with FIG. 10, read scheduling (arbitration) is performed by the read controller 10 to the read queues 8_1-8_4 in which the write addresses are stored as shown in FIG. 9 (at step S6) to acquire the read address from the read queue 8. Upon the acquiring, checking the parity bit for the detection of failure is performed (at step S7). The example of FIG. 11 shows a case where an error Err occurs in the parity check for the detection of failure in a part (addresses "1 and 2") of the addresses acquired. As for the addresses without error, the operation is the same as that described in FIG. 10.

As to data (addresses of the shared buffer SB) where the error Err has occurred, it is considered that a bit error has occurred. Therefore, the data (addresses) read from the queue 8 are invalidated (at step S10), and the addresses are not used for reading the frame data from the shared buffer SB (at step S11).

At this time, the read controller 10 does not return the addresses (errors are detected upon the failure detection) acquired to the write address Fifo 5 as areas read from the shared buffer SB. Specifically, the read controller 10 does not notify the data (addresses) having the errors Err occurred to the WAF write controller 11. Accordingly, in this example, only the frame data D and A of the addresses "3 and 0", free from error, of the shared buffer SB are read, and concurrently only the addresses "3 and 0" of the shared buffer SB are sequentially written as data of the addresses "0 and 1" of the write address Fifo 5. However, the data of addresses "2 and 3" of the write address Fifo 5 remain the same as FIG. 9.

Thus, in the prior art example, when an abnormal operation has occurred in the management of the shared buffer, a shared buffer area portion corresponding thereto is invalidated (not read), so that a malfunction has been prevented.

It is to be noted that there has been proposed a memory monitoring method which is provided with a used map monitoring portion, an unused map monitoring portion, and a search monitoring portion in addition to a data storing memory, an address storing memory, a parity inserting portion of a free address storing memory, and a parity abnormality detector, and which detects an address composition, an address disappearance, and an abnormal chain occurrence per chain (see e.g. patent document 1).

Also, there has been proposed a device in which an address management circuit portion of a shared buffer has a CAM managing a free address of the shared buffer and a read address per output port No., and an address retrieving portion retrieving the free address and the read address from the CAM, a management method of the address has a step of accumulating the free address of the shared buffer and the read address in a single CAM, and a step of retrieving the free address or the read address of the shared buffer by an address pointer of the CAM, and the address of the shared buffer of an ATM cell is managed (see e.g. patent document 2).

[Patent document 1] Japanese patent application laid-open No. 11-102325

[Patent document 2] Japanese patent application laid-open No. 11-261569

The operation description of the prior art examples shown in FIGS. 8-11 mentions the examples of no bit error occurrence (FIG. 10) and the bit error occurrence (FIG. 11) in the addresses read from the read queues 8_1-8_4, in which the read controller 10 has read all of the addresses written in the read queue 8 after the schedule management, where there is a difference in the state of the write address Fifo 5 after reading all of the addresses between the case where an error has occurred and the case where no error has occurred.

When no error has occurred, the frame data is read from the shared buffer SB by using the data (address) read from the read queue 8, thereby returning the data (address of the shared buffer SB) to the write address Fifo 5 as a free address space within the shared buffer SB. In this example, the writing in the read queue 8 and the read from the read queue 8 are respectively performed four times, and the return of free address to the write address Fifo 5 is performed four times (writing is performed four times), so that the number of free address spaces of the shared buffer SB stored in the write address Fifo 5 assumes 1024.

On the other hand, when an error has occurred, there is a high possibility that the data (address) read upon error occurrence includes a bit error. Therefore, the read data is invalidated, and the return of free address to the write address Fifo 5 is not performed. For this reason, in this example, the writing in the read queue 8 and the reading from the read queue 8 are respectively performed four times, and the return to the write address Fifo 5 is performed two times (write is performed two times), so that the number of free address spaces stored in the write address Fifo 5 assumes 1022 (−2 compared with the case of no error occurrence). Namely, when the read address is not returned as a free address to the write address Fifo 5, the addresses "1 and 2" of the shared buffer SB remain unused.

This results from the fact that the free area management of the write address Fifo 5 is performed based on a memory capacity. Namely, in the state of FIG. 11, the free addresses "0 and 3" of the shared buffer SB are stored in the addresses "1 and 0" of the write address Fifo 5, and the invalid (unused) addresses "2 and 3" of the shared buffer SB are stored in the addresses "2 and 3". The then free address areas (free address areas of the shared buffer SB) of the write address Fifo 5 are "1024−2=1022". In this state, the next frame data is written in the shared buffer SB with the data "4" indicated in the address "4" of the write address Fifo 5 being made a write address. The writing in the shared buffer SB is performed up to the address "1023" by the circular address, and then is performed to the addresses "0 and 1".

At this time, the capacity of the write address Fifo 5 becomes full (free address area of the shared buffer SB is 0), so that the writing in the shared buffer SB is stopped by the WAF read controller 2 managing the write address Fifo 5. Thereafter, when any of frame data is read from the shared buffer SB, the address of the shared buffer SB from which the frame data is read is returned as a free address to the address "2" of the write address Fifo 5.

As a result, the frame data B and C remain left in the shared buffer SB without being read.

Thus, the address space of the shared buffer SB in which an error was once detected and which could not be returned to the write address Fifo 5 can not be returned in the subsequent operation. Therefore, physically existing 1024 address spaces are reduced to 1022 (−2) address spaces by the error, so that there has been a problem that the capacity of the shared buffer SB becomes smaller every time an error occurs.

SUMMARY OF THE INVENTION

It is accordingly an object of the present invention to provide a frame transfer method and device which can efficiently utilize an address space of a shared buffer without a reduction of the address space even if an abnormal operation has occurred in the management of the shared buffer.

In order to achieve the above-mentioned object, a frame transfer method (or device) according to the present invention comprises: a first step of (or memory) storing an address of a shared buffer from which frame data has not been read during one monitor cycle when the frame data is to be read without fail after the frame data has been written in the shared buffer, and detecting the address in a next monitor cycle; and a second step of (or setter) setting the address detected in the next monitor cycle as a free address of the shared buffer.

Namely, the present invention takes advantage of a principle that data written in a shared buffer is read without fail within a certain fixed time, where presence/absence of an access is monitored once in a fixed time to all addresses of the shared buffer.

As for the monitoring method, a monitoring cycle (the above-mentioned fixed time when a frame is read from the shared buffer without fail) is set, and an address space without an access (read) during the monitor cycle after writing the frame in the shared buffer is detected during one monitor cycle. Accordingly, it becomes possible to detect the address space to which at least the writing has been performed during the monitor cycle but the reading has not been performed.

Namely, considering a normal operation free from an error by e.g. parity check, since the frame data written in the shared buffer during the monitor cycle is read without fail during the monitor cycle, the above-mentioned address space to which the writing has been performed but the reading has not been performed is read by the next monitor cycle to form a free address space.

Contrarily, when the reading the frame has not been performed from the shared buffer during the monitor cycle (e.g. error has been found in parity check), the address where the frame can not be read from the shared buffer is to be detected during the next monitor cycle. Therefore, the detected address is set (released) as a free address of the shared buffer at this time during the next monitor cycle.

Also, the above-mentioned first step (or memory) may include a step of (or manager) managing a read address at a time when reading the frame data is performed from the shared buffer as a free address, a step of (or generator) generating the monitor cycle, and a step of (or setter) setting to a first state a check bit composed of a write flag and a monitor flag combined with a write address upon writing the frame data in the shared buffer, updating the check bit in the first state to a second state at starting the one monitor cycle, and updating, when the frame data is then read from the shared buffer during the one monitor cycle, a check bit for the read address from the second state to a third state, and the second step (or setter) may include a step of (or releaser) releasing, when the second state is detected during the next monitor cycle, the address detected as a free address.

Also, the above-mentioned second step (or setter) may further include a step of (or updator) updating the second state to the third state when the second state is detected during the next monitor cycle.

Thus, in the present invention, all of the areas of the shard buffer are checked after the occurrence of the error which reduces the capacity of the shared buffer, the area invalidated within the areas is detected, so that the detected area is released as a free area so as to be used as a valid area, thereby enabling an area of the shared buffer to be effectively utilized.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 4A-4E are block diagrams for illustrating an operation example (normal time) of a write address Fifo (WAF) check buffer used for the arrangement of the present invention shown in FIG. 1;

FIGS. 6A-6F are block diagrams for illustrating an operation example (abnormal time) of a write address Fifo (WAF) check buffer used for the arrangement of the present invention shown in FIG. 1;

FIG. 11 is a block diagram for illustrating a read side operation example (abnormal time) of the shared buffer in the prior art example shown in FIG. 8.

DESCRIPTION OF THE EMBODIMENTS

[1] Arrangement

FIG. 1

Figure 1:
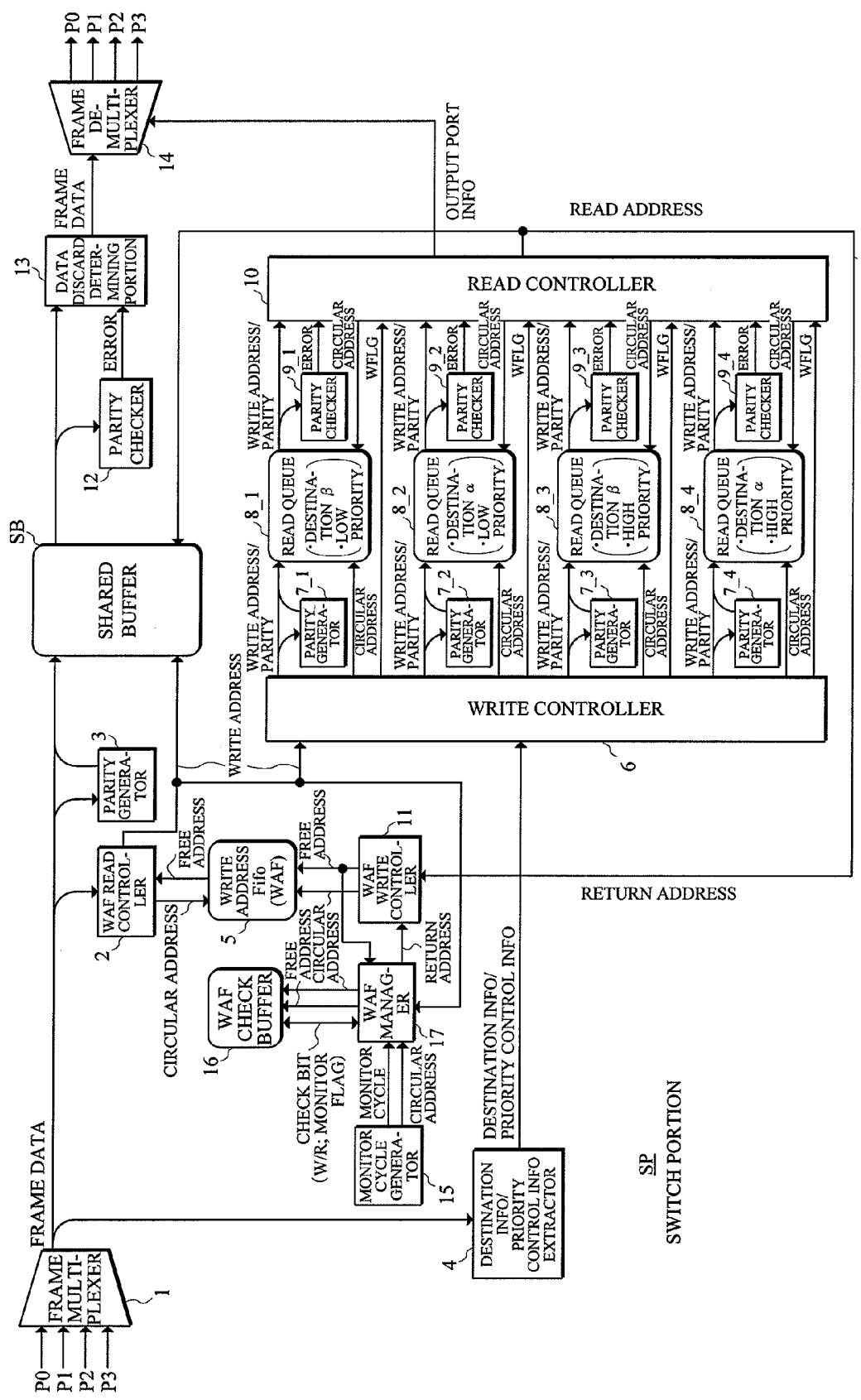
FIG. 1 is a block diagram showing an arrangement of the present invention applied to a switch card in an L2 switch.
Figure 7:
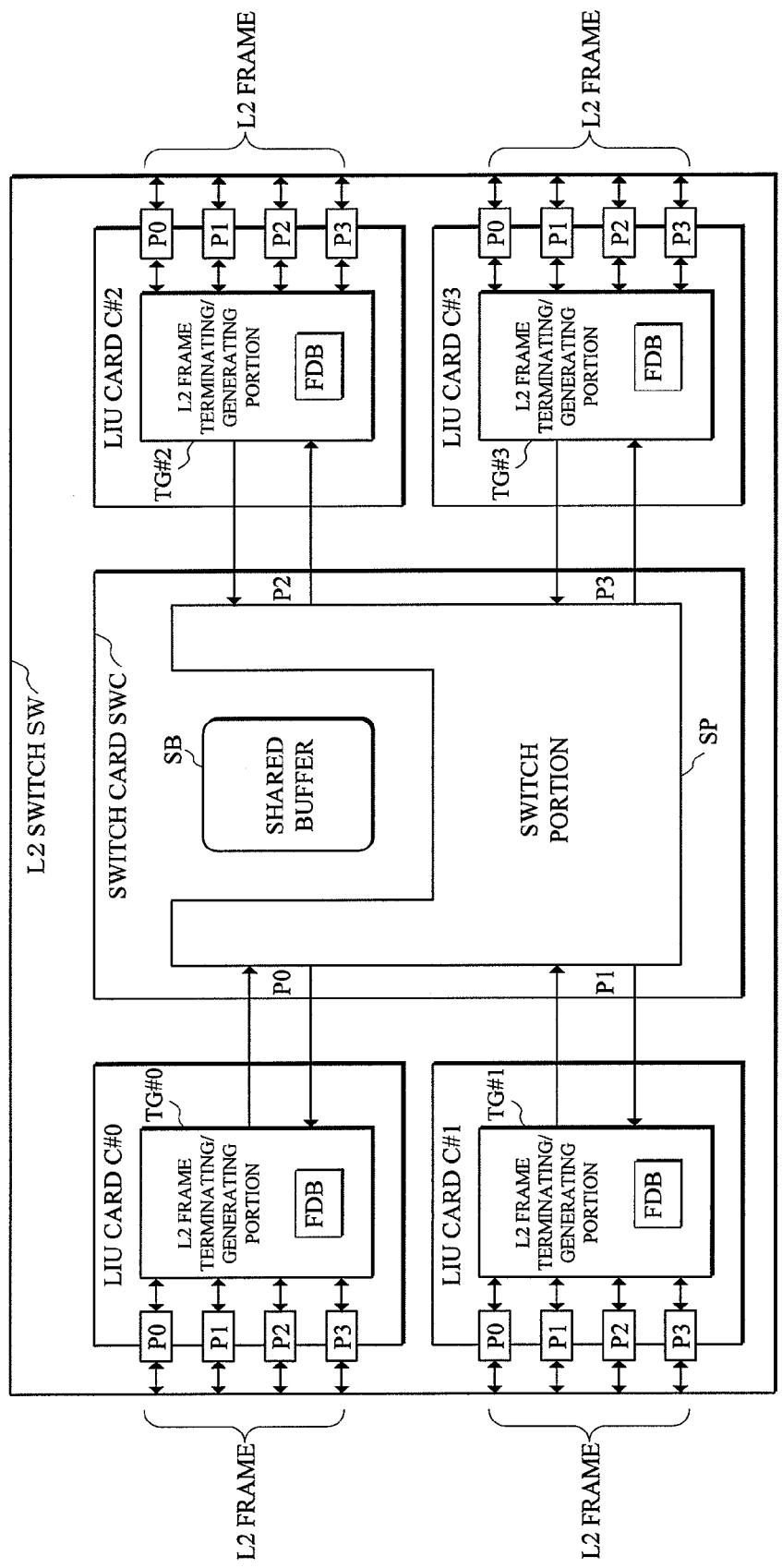
FIG. 7 is a block diagram showing an schematic arrangement of an L2 switch where the present invention and the prior art example are commonly applied.
Figure 8:
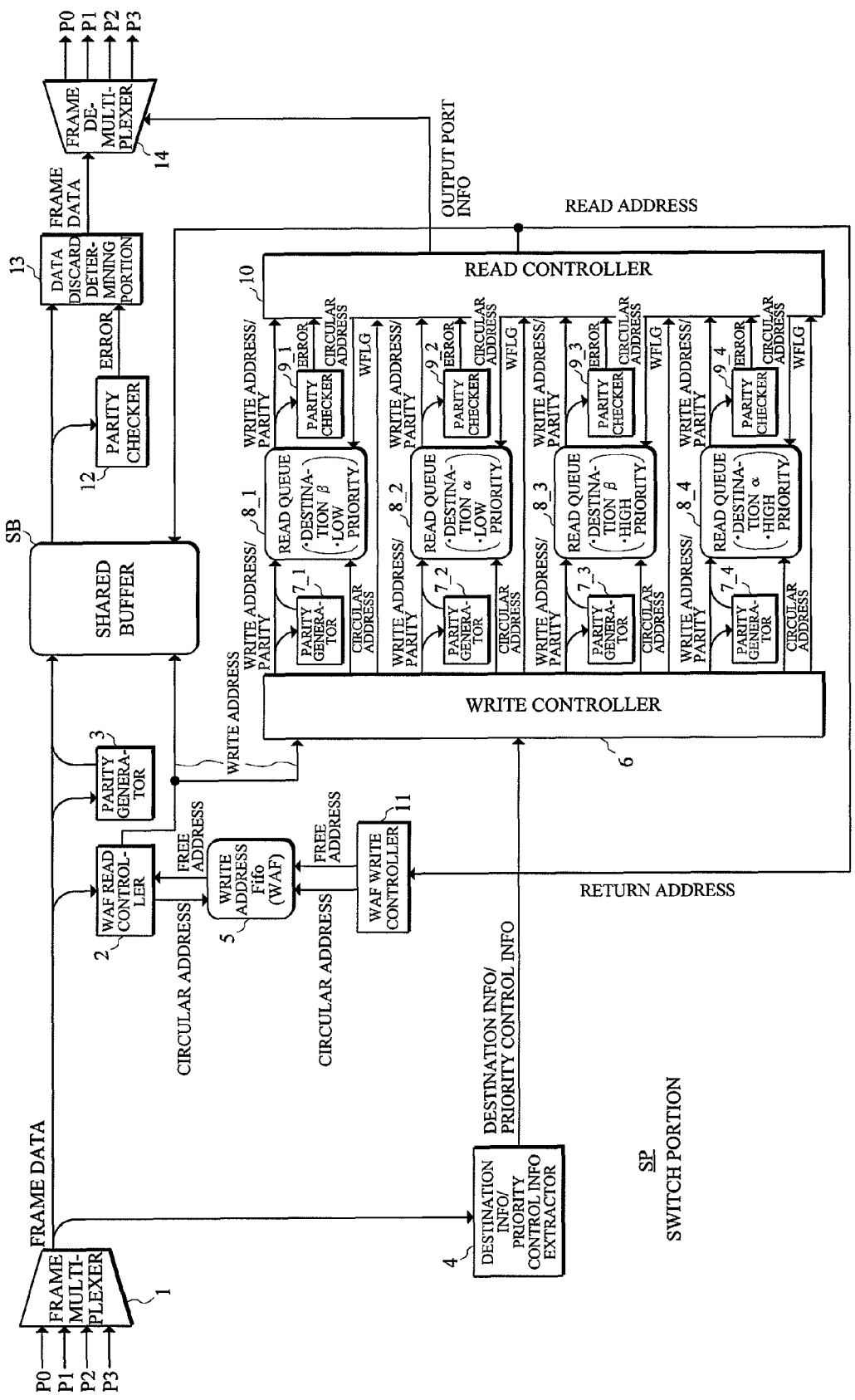
FIG. 8 is a block diagram showing a prior art arrangement of a frame transfer device applied to a switch card in an L2 switch.

FIG. 1 shows an arrangement of the present invention applied to the switch card SWC in the general L2 switch shown in FIG. 7. This arrangement further includes a monitor cycle generator 15, a WAF check buffer 16, and a WAF manager 17, in addition to the prior art example shown in FIG. 8.

The WAF manager 17 concurrently receives a free address which the WAF write controller 11 receives from the write controller 10 and writes in the write address Fifo 5 as data, and performs writing check bits (W/R (write/read) state and monitor flag) in the WAF check buffer 16 based on the write address to the shared buffer SB from the WAF read controller 2. When the frame data is read from the shared buffer SB, a W/R state is made "0" (read) and the monitor flag is cleared to "0" (the third state of the check bits).

The monitor cycle generator 15 generates a monitor cycle (interval in which the frame data written in the shared buffer SB is read without fail), generates a circular address so that checking an address space by the WAF check buffer 16 may go round in the cycle, and transfers the circular address to the WAF manager 17.

The WAF manager 17 reads the check bits from the WAF check buffer 16 with the circular address received from the monitor cycle generator 15 being made a read address, and checks the W/R state and the monitor flag.

When the W/R state read from the WAF check buffer 16 is "1" (write) and the monitor flag is "0" state (state where reading has not been executed yet after writing frame data in the shared buffer SB=the first state of the check bits), the WAF manager 17 updates the same address with the W/R state being made "1" and the monitor flag being made "1" (the second state of the check bits) upon starting the monitor cycle.

Also, when the W/R state read from the WAF check buffer 16 is "0" (state where reading has already been executed after writing frame data in the shared buffer SB), the WAF manager 17 updates the same address with the W/R state being made "0" and the monitor flag being made "0" (the third state of the check bits).

Furthermore, when the state of the W/R state="1" and the monitor flag="1" (state where reading has not been executed yet after writing frame data in the shared buffer SB=the second state of the check bits) lasts longer than the monitor cycle, the WAF manager 17 detects an unused (unread or invalidated) area of the shared buffer SB, updates back the same address with the W/R state being made "0" and the monitor flag being made "0" (the third state of the check bits), and then returns the detected address to the WAF write controller 11. It is to be noted that the state of the W/R state="0" and the monitor flag="1" does not exist, while the check bits are formed of 2 bits where the monitor flag is added to the W/R bit for determining the first-third states.

The WAF write controller 11 stores as data the return address received from the WAF manager 17 in the write address Fifo 5, thereby returning the unused address area of the shared buffer SB. At this time, the WAF write controller 11 performs arbitration of an access for the return address received from the read controller 10 and the return address received from the WAF manager 17. Also, the address becomes a circular address managed by the WAF write controller 11. It is to be noted that the operation of the WAF manager 17 will also be mentioned in the next operation example.

[2] Operation Example

FIGS. 2-6F

Hereinafter, an operation up to transferring the frame data received from each of the ports P0-P3 in the switch card SWC shown in FIG. 1 to the ports P0-P3 which form the destination, and operations of monitoring the free address space of the shared buffer SB and releasing the address space will now be described referring to FIGS. 2-6F.

Figure 2:
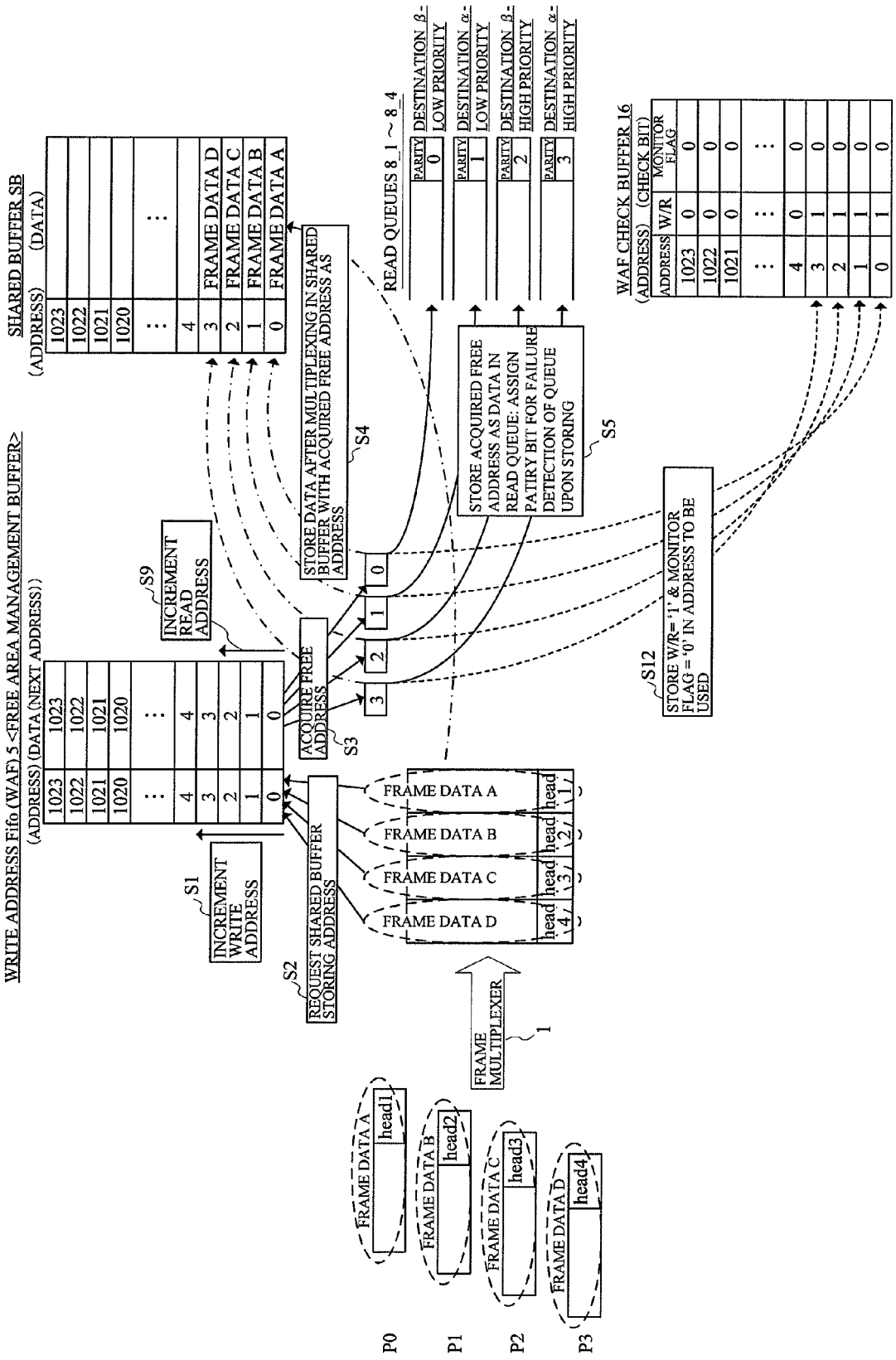
FIG. 2 is a block diagram for illustrating a write side operation example of the shared buffer in the arrangement of the present invention shown in FIG. 1.
Figure 9:
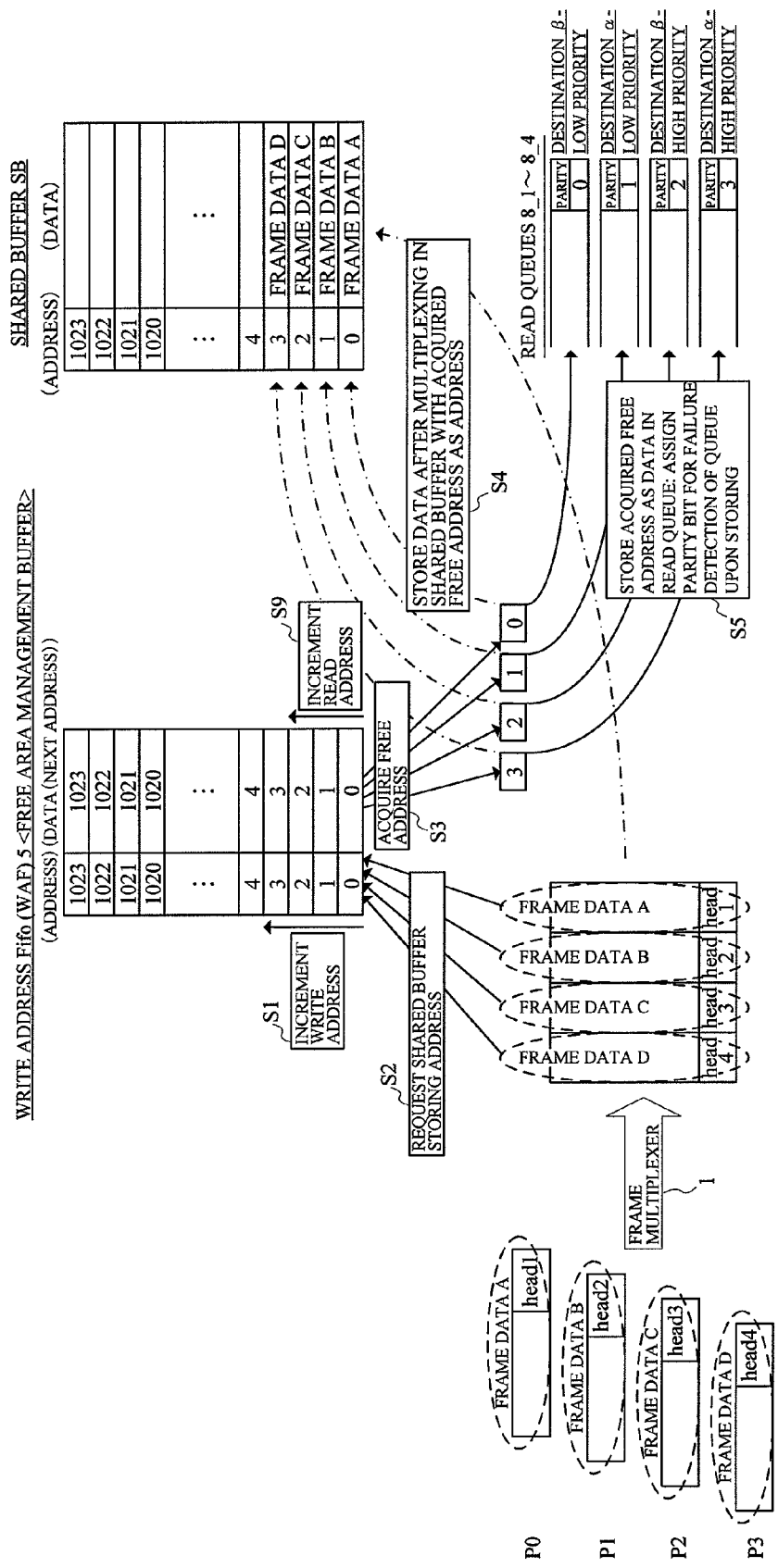
FIG. 9 is a block diagram for illustrating a write side operation example of the shared buffer in the prior art example shown in FIG. 8.

Firstly in the writing operation example shown in FIG. 2, steps S1-S5 are the same as those in the writing operation example of the prior art example shown in FIG. 9. However, this is different from the prior art example shown in FIG. 9 in that concurrently with step S5, the WAF manager 17 writes the W/R="1" (write) and the monitor flag="0" as the check bits in the address used within the shared buffer SB (write address from the WAF read controller 2) for the WAF check buffer 16 (at step S12).

Figure 3:
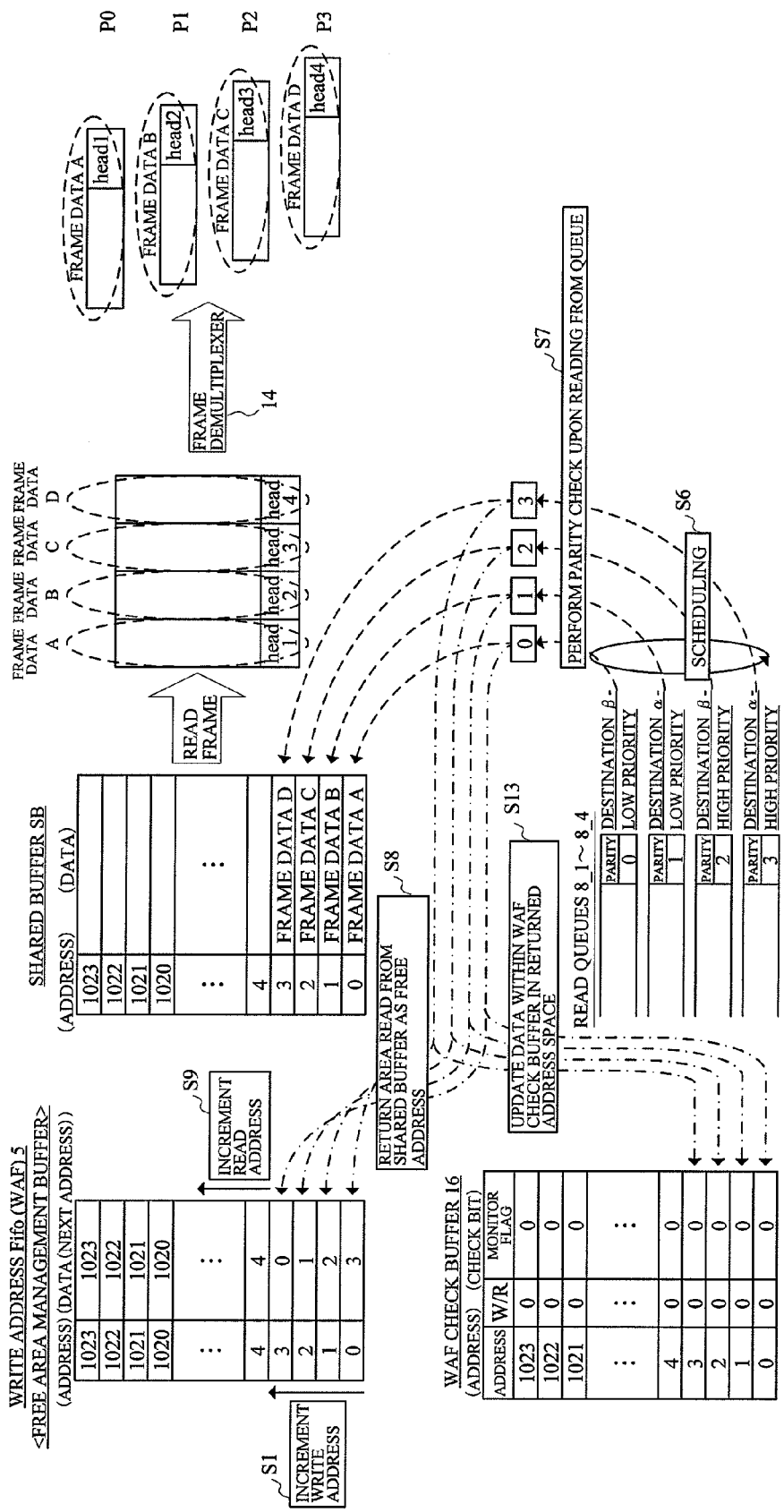
FIG. 3 is a block diagram for illustrating a read side operation example (normal time) of a shared buffer in the arrangement of the present invention shown in FIG. 1.
Figure 10:
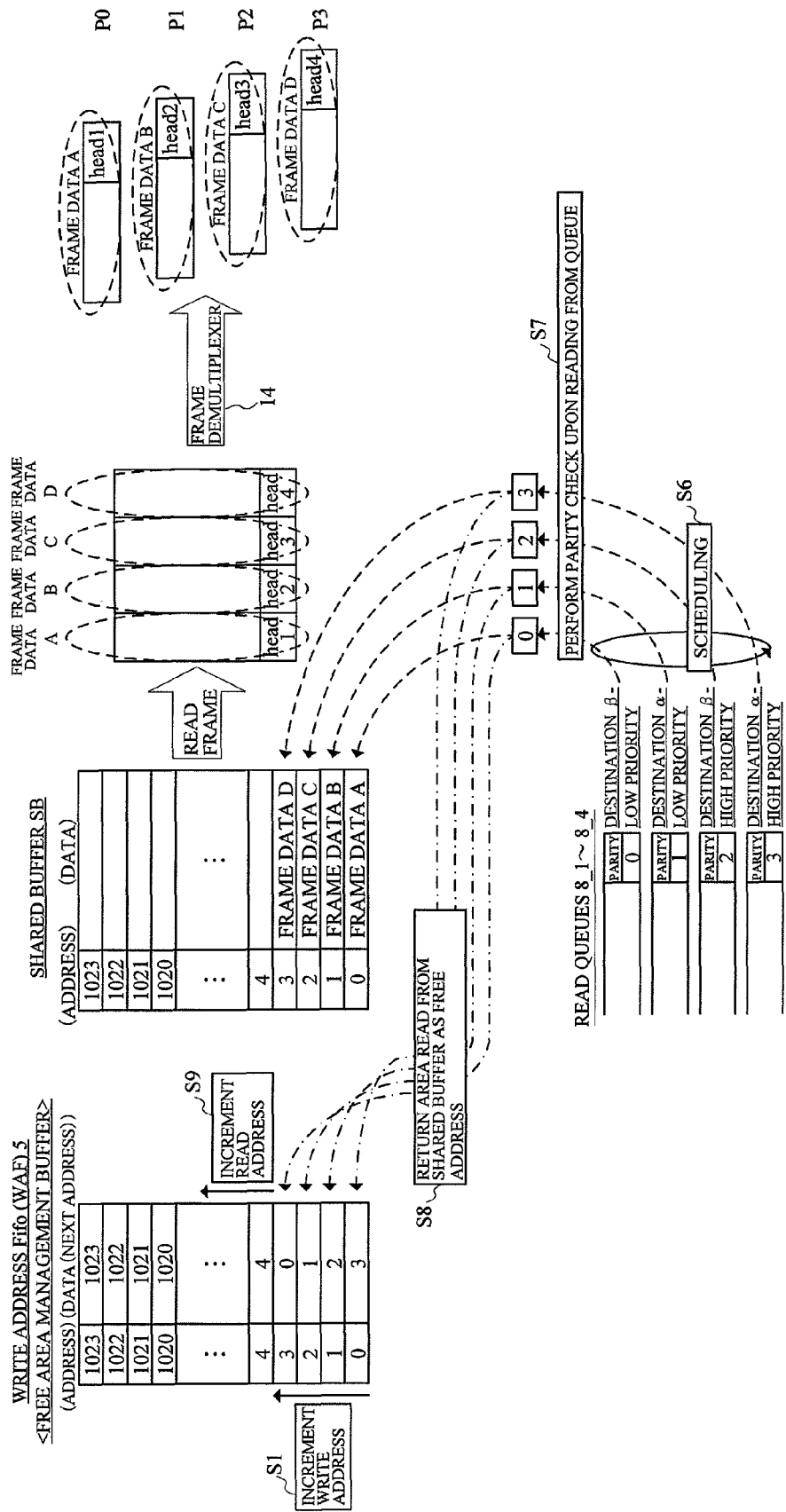
FIG. 10 is a block diagram for illustrating a read side operation example (normal time) of the shared buffer in the prior art example shown in FIG. 8.

In the reading operation example (normal time) shown in FIG. 3, steps S1, and S6-S9 are the same as those in the reading operation of the prior art example shown in FIG. 10. However, this is different from the prior art example shown in FIG. 10 in that the WAF write controller 11 returns to the write address Fifo 5 the address (no error is detected in failure detection) acquired from the read controller 10 as an address read from the shared buffer SB (at step S8), and concurrently the WAF manager 17 also receives this returned address through the WAF write controller 11 and updates the W/R to "0" (read) and the monitor flag to "0" for the WAF check buffer 16 as a free address released in the shared buffer SB (at step S13).

The operation example (normal time) of the WAF check buffer shown in FIGS. 4A-4E describes an operation of the frame data transferred in FIGS. 2 and 3 with the monitor cycle generated by the monitor cycle generator 15 as a time axis. The time axis indicates an order of monitor cycle N−1 (Old) →monitor cycle N→monitor cycle N+1 (New).

(1) Monitor Cycle N−1 (Old) (FIG. 4A)

Firstly, as having already described in FIG. 2, upon writing the frame data in the shared buffer SB, the write addresses are stored in the write address Fifo 5, as shown in FIG. 4E (and FIG. 10), corresponding to the input of the frame data A-D. Concurrently the W/R="1" (write) and the monitor flag="0" are written in the data storing addresses "0, 1, 2, and 3" of the WAF check buffer 16 (at step S21).

(2) Monitor Cycle N (FIG. 4B)

When the monitor cycle N−1 is switched over to the monitor cycle N, namely, one monitor cycle N is started, a check operation for all of the address spaces of the WAF check buffer 16 is started during the monitor cycle N, whereby the W/R bits and the monitor flags from the addresses "0" to "1023" are sequentially checked. As a result, in this example, the areas of the addresses "0, 1, 2, and 3" indicate the W/R="1" and the monitor flag="0" (unread state after writing in the shared buffer SB=the first state), so that no error is detected (at step S22). It is to be noted that while the error detection during the monitor cycle N is not certain, "no error" is determined during the monitor cycle N+1. The other areas indicate the W/R="0" and the monitor flag="0" (no writing in the shared buffer SB, free space; already read during the monitor cycle after writing in the shared buffer SB=the third state), so that no error is detected (at step S23).

At the time of the above-mentioned checking of the buffer 16, only the check bits of the addresses in the first state are updated. In this example, the areas of the addresses "0, 1, 2, and 3" in the first state are updated with the W/R="1" and the monitor flag="1" (unread state after writing in the shared buffer SB and monitor cycle already checked=the second state) (at step S22), and other addresses in the third state are updated with the W/R="0" and the monitor flag="0" (still the third state) (at step S23).

It is to be noted that since this update operation has only to be performed during the one monitor cycle N for a single address of the buffer 16, and checking (reading) the buffer 16 is performed in order of address, the check bits of the other addresses of the buffer 16 may be updated (the third state→the first state) in connection with the writing in the shared buffer SB while a single write update operation is being performed.

(3) Monitor cycle N; After Reading from Shared Buffer (FIG. 4C)

The read controller 10 reads the write addresses from the read queues 8_1-8_4 (no error is detected in the failure detection) during the monitor cycle N, and reads the frame data from the shared buffer SB by using the read addresses. At this time, the read addresses are returned from the read controller 10 to the WAF write controller 11, whereby the addresses are provided to the WAF manager 17 concurrently when the addresses are provided from the WAF write controller 11 to the write address Fifo 5 as free addresses. Thus, the WAF manager 17 updates the W/R="0" and the monitor flag="0" (no writing in the shared buffer SB, free space) for the WAF check buffer 16, thereby storing a read finished state from the shared buffer SB (at step S24).

The monitor cycle generated by the monitor cycle generator 15 indicates a time of enabling frames to be transferred without fail in a system operation. For example, in a case of a system where the frame data stored in the shared buffer SB is outputted without fail within 3 ms, the monitor cycle is set to be equal to or more than 3 ms.

(4) Monitor Cycle N+1 (FIG. 4D)

When the monitor cycle is further switched over to the next monitor cycle N+1, the check operation for all of the address spaces of the WAF check buffer 16 is restarted during the monitor cycle N+1, and the W/R bits and the monitor flags are checked sequentially from the addresses "0" to "1023". In this example, all of the areas indicate a case of the W/R="0" and the monitor flag="0" (no writing in the shared buffer SB, free space), or a case where no error is detected (no detection of free area) (at step S25). At this point, the above-mentioned "no error detection" is determined.

Figure 5:
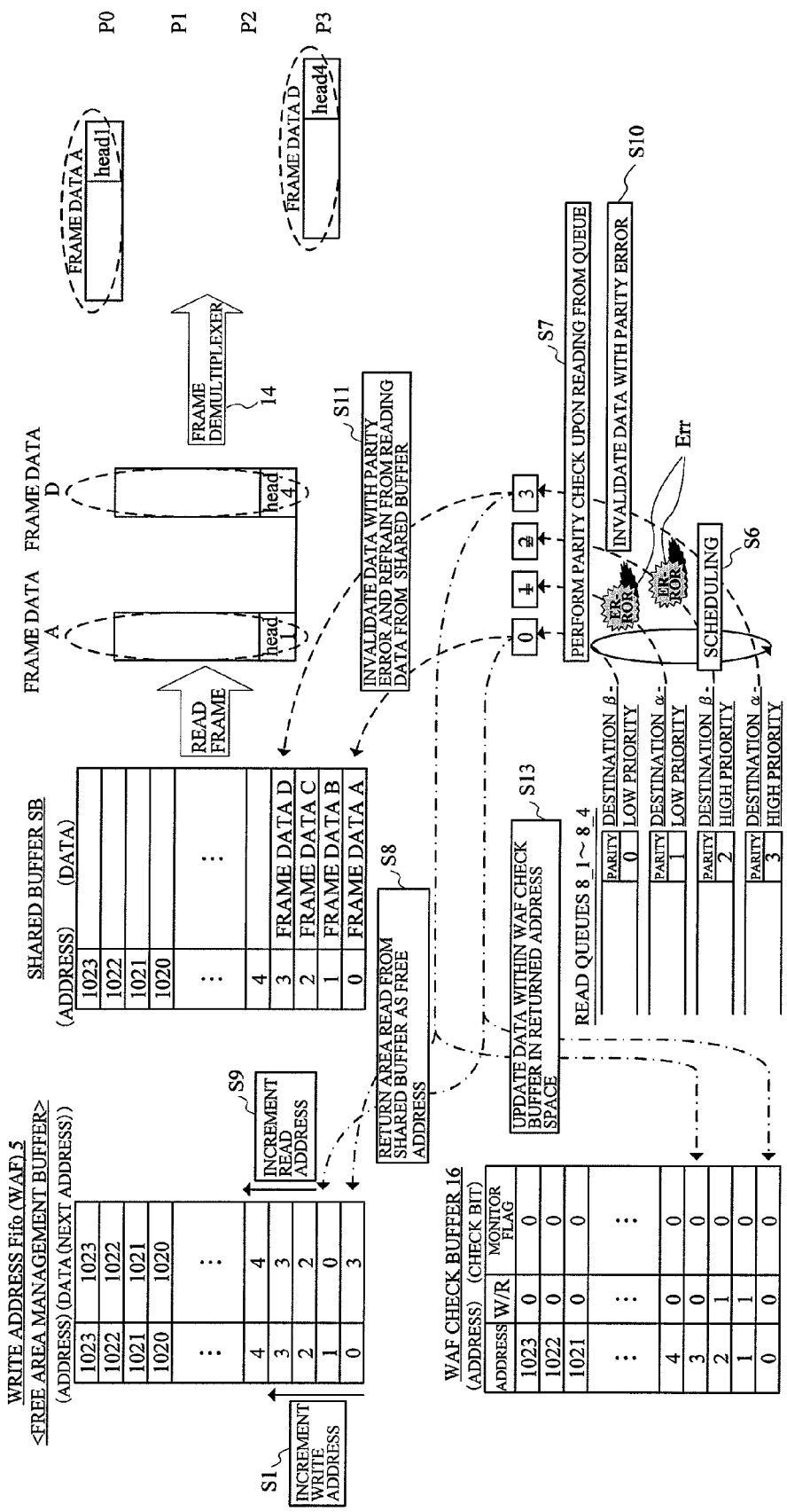
FIG. 5 is a block diagram for illustrating a read side operation example (abnormal time) of the shared buffer in the arrangement of the present invention shown in FIG. 1.

In the reading operation example (abnormal time) shown in FIG. 5, the read controller 10 performs read scheduling (arbitration) for the read queue 8 (at step S6) in the same way as FIG. 3, and acquires the read address from the read queue 8. Upon acquiring the address, the parity bit for the detection of failure is checked (at step S7). The example of FIG. 5, in the same way as the prior art example of FIG. 11, indicates a case where errors have occurred in the parity check for the failure detection in the acquired addresses "1 and 2". When no error is detected, the operation is the same as that described in FIG. 3.

It can be conceived that bit errors have occurred in the write addresses "1 and 2" where the errors have occurred, so that the write addresses which have been read are invalidated (at step S10) and are not used as addresses for reading the frame data from the shared buffer SB. This is because with these addresses used, data of wrong addresses may be outputted.

Also, the acquired addresses "1 and 2" (errors are found by the failure detection) are not returned to the write address Fifo 5 as areas read from the shared buffer SB. This is because when they are returned, wrong address spaces are to be returned in the same way as the prior art example, whereby the original data before reading may be updated.

Furthermore, as for the acquired addresses "1 and 2" (errors are found by the failure detection), accesses to the WAF check buffer 16 are not performed. It is to be noted that since the area within the shared buffer SB has not been released (read) as mentioned above, the read finished processing is not performed.

In the operation example (abnormal time) of the WAF check buffer 16 shown in FIGS. 6A-6F, the operation of the frame data transferred in FIGS. 2 and 5 is described by using the same monitor cycle as that of FIGS. 4A-4E as the time axis. This operation example is different from that of FIGS. 4A-4E only in the following cycles (3a) and (4a), where also in this example, as with the prior art shown in FIG. 11, it is supposed that errors have occurred in the parity check for failure detection in the addresses "1 and 2" of the shared buffer SB:

(3a) Monitor Cycle N; After Reading (FIG. 6C)

When a scheduling request from the read controller 10 is received during the monitor cycle N, the write addresses are read from the queues 8_1-8_4. In the absence of error found in the failure detection (queue 8_4 of destination α—high priority, and queue 8_1 of destination β—low priority), reading the frame data is performed from the shared buffer SB by using the write addresses "0 and 3" which have been read. Concurrently, for the check bits of the WAF check buffer 16 with the write addresses "0 and 3" which have been read, the WAF manager 17 updates the W/R="0" and monitor flag="0" (no writing in the shared buffer SB, free space) (at step S24), thereby storing the read finished state from the shared buffer SB.

When errors Err are found by the failure detection (queue 8_3 of destination β—high priority, and queue 8_2 of destination α—low priority), there is a possibility that bit errors have occurred in the write addresses "1 and 2" which have been read, so that the data are invalidated, where reading from the shared buffer SB, returning to the write address Fifo 5, and updating the check bit to the WAF check buffer 16 are not performed. Namely, in the WAF check buffer 16, the check bits of the addresses "1 and 2" remain the W/R="1" and the monitor flag="1" (the second state).

(4a) Monitor Cycle N+1 (FIG. 6D)

When the monitor cycle is further switched over to the next monitor cycle N+1, the check operation is restarted for all of the address spaces of the WAF check buffer 16 during the monitor cycle N+1, so that the W/R bits and the monitor flags from the addresses "0" to "1023" are sequentially checked. This example indicates the W/R="1" and the monitor flag="1" (no read during monitor cycle after writing to the shared buffer SB=the second state) in the addresses "1 and 2" of the WAF check buffer 16, performs the error detection (detected as unused area), and updates the check buffer areas of the addresses "1 and 2" with the W/R="0" and the monitor flag="0" (the third state) (at step S26). The other address spaces indicate the W/R="0" and the monitor flag="0" (no writing in the shared buffer SB, free space), so that no error is detected.

Also, the WAF manager 17 returns the unused addresses "1 and 2" previously detected to the write address Fifo 5 through the WAF write controller 11 (at step S27), so that the next address data "3, 0, 1, and 2" are written in the addresses "0, 1, 2, and 3" of the write address Fifo 5 shown in FIG. 6F, thereby releasing an area unavailable as a free space within the shared buffer SB due to a failure.

It is to be noted that the present invention is not limited by the above-mentioned embodiments, and it is obvious that various modifications may be made by one skilled in the art based on the recitation of the claims.

What is claimed is:

1. A frame transfer method comprising:
    storing an address of a shared buffer from which frame data has not been read out within one monitor cycle that is a certain fixed time for which the frame data should be read out without fail under a normal operation free from an error after the frame data had been written in the shared buffer,
    detecting the address in a next monitor cycle; and
    setting the address detected in the next monitor cycle as a free address of the shared buffer,
    wherein the storing includes managing a read address at a time when reading the frame data is performed from the shared buffer as a free address, generating the monitor cycle, and setting to a first state a check bit composed of a write flag and a monitor flag combined with a write address upon writing the frame data in the shared buffer, updating the check bit in the first state to a second state at starting the one monitor cycle, and updating, when the frame data is then read from the shared buffer during the one monitor cycle, a check bit for the read address from the second state to a third state, and
    the setting the address includes releasing, when the second state is detected during the next monitor cycle, the address detected as a free address.

2. The frame transfer method as claimed in claim 1, wherein the setting the address further includes updating the second state to the third state when the second state is detected during the next monitor cycle.

3. A frame transfer device comprising:
a memory storing an address of a shared buffer from which frame data has not been read out within one monitor cycle that is a certain fixed time for which the frame data should be read out without fail under a normal operation free from an error after the frame data had been written in the shared buffer,
a detector detecting the address in a next monitor cycle; and
a setter setting the address detected in the next monitor cycle as a free address of the shared buffer,
wherein the memory includes a manager managing a read address at a time when reading the frame data is performed from the shared buffer as a free address, a generator generating the monitor cycle, and a setter setting to a first state a check bit composed of a write flag and a monitor flag combined with a write address upon writing the frame data in the shared buffer, updating the check bit in the first state to a second state at starting the one monitor cycle, and updating, when the frame data is then read from the shared buffer during the one monitor cycle, a check bit for the read address from the second state to a third state, and
the setter includes a releaser releasing, when the second state is detected during the next monitor cycle, the address detected as a free address.

4. The frame transfer device as claimed in claim 3, wherein the setter further includes an updator updating the second state to the third state when the second state is detected during the next monitor cycle.

* * * * *